United States Patent
Park et al.

(10) Patent No.: US 9,527,739 B2
(45) Date of Patent: Dec. 27, 2016

(54) METHOD FOR PREPARING GRAPHITE FILM

(71) Applicant: GUARDNEC CO., LTD., Yongin-si, Gyeonggi-do (KR)

(72) Inventors: Ki-Ho Park, Yeoju-si (KR); Won-Seok Choi, Osan-si (KR); Woo-Jeong Kim, Pyeongtaek-si (KR)

(73) Assignee: Guardnec Co., Ltd., Yongin-si, Gyeonggi-do (KR)

( * ) Notice: Subject to any disclaimer, the term of this patent is extended or adjusted under 35 U.S.C. 154(b) by 83 days.

(21) Appl. No.: 14/534,329

(22) Filed: Nov. 6, 2014

(65) Prior Publication Data

US 2016/0060118 A1 Mar. 3, 2016

(30) Foreign Application Priority Data

Aug. 27, 2014 (KR) .......................... 10-2014-0112550

(51) Int. Cl.
| | | |
|---|---|---|
| *C01B 31/04* | (2006.01) | |
| *C01B 31/02* | (2006.01) | |
| *H05B 3/14* | (2006.01) | |

(52) U.S. Cl.
CPC ............... *C01B 31/04* (2013.01); *C01B 31/02* (2013.01); *H05B 3/145* (2013.01)

(58) Field of Classification Search
CPC ............. H05B 3/00; H05B 3/02; H05B 3/023; H05B 3/145; C01B 31/04; C01B 31/02
See application file for complete search history.

(56) References Cited

U.S. PATENT DOCUMENTS

| 6,683,783 B1 | 1/2004 | Smalley et al. |
| 8,512,670 B2 | 8/2013 | Nishikawa et al. |
| 2010/0062220 A1 | 3/2010 | Nishikawa |
| 2014/0004033 A1 | 1/2014 | Ohta et al. |
| 2014/0110869 A1 | 4/2014 | Mishiro et al. |
| 2015/0044364 A1 | 2/2015 | Katayama et al. |

FOREIGN PATENT DOCUMENTS

| KR | 1020140002671 | 1/2014 |
| WO | 2012128187 A1 | 9/2012 |
| WO | 2014046187 A1 | 3/2014 |

OTHER PUBLICATIONS

Korean Search Report issued in corresponding Korean Patent Application No. 10-2014-0112550 mailed Apr. 6, 2015.

*Primary Examiner* — Richard M Rump (74) *Attorney, Agent, or Firm* — Davis & Bujold PLLC; Michael J. Bujold (57) ABSTRACT

There is provided a method for preparing a graphite film by using a single continuous heater, the method including: converting a polymer film to a carbonized film by introducing the polymer film into a first heater having a first temperature section; and converting the carbonized film to the graphite film by introducing the carbonized film into a second heater having a second temperature section where a temperature linearly increases.

15 Claims, 8 Drawing Sheets

METHOD FOR PREPARING GRAPHITE FILM

CROSS-REFERENCE TO RELATED APPLICATIONS

This application claims priority to Korean Patent Application No. 10-2014-0112550, filed on Aug. 27, 2014, which is herein incorporated by reference in its entirety.

BACKGROUND OF THE INVENTION

Field of the Invention

The present invention relates to a method for preparing a graphite film.

Description of the Related Art

Due to a tendency of slimming, lightening, increase in screen size, flexibilization of an electronic product, internal circuits and components have been miniaturized and thinned. Thus, during an operation of a product, the product may be deteriorated or damaged due to heat of a component. Therefore, there has been conducted a study of an efficient heat radiation structure with respect to the component which is a heat source of the electronic product.

Therefore, a demand for a multi-function dissipating sheet has been increased, and, thus, a graphite sheet having a high heat conductivity and heat radioactivity has been developed.

A graphite film is a material having a high heat conductivity and has been widely used, for example, in an electronic component. Examples of a method for preparing a generally available graphite film having a high heat conductivity may include an expand method of rolling expanded graphite in a sheet form or a polymer thermal decomposition.

In particular, in the case of a polymer thermal decomposition, a polymer film as a source material is contracted during a preparation process, and, thus, wrinkles are often generated. Thus, conventionally, a polymer film is cut (into, for example, an A4 size), and stacked in layers, and then, a graphite film is prepared by thermal decomposition. In this case, it is necessary to separate each graphite film after a heat treatment process and then fix the graphite film for laminating on the film. Thus, the equipment needs to have a high capacity, the separation operation requires many operators, and a production time increases.

SUMMARY OF THE INVENTION

An object of the present invention is to provide a method for preparing a graphite film. The method enables continuous production in a roll type and thus remarkably reduces a production time and labor costs.

According to an exemplary embodiment of the present invention, there is provided a method for preparing a graphite film by using a single continuous heater, the method including: converting a polymer film to a carbonized film by introducing the polymer film into a first heater having a first temperature section; and converting the carbonized film to the graphite film by introducing the carbonized film into a second heater having a second temperature section where a temperature linearly increases.

Herein, the first temperature section is a section where the temperature linearly increases from 500±50° C. to 1000° C., and the second temperature section is a section where the temperature linearly increases from 1000° C. to 2800° C.

Herein, the second heater has a length of 4000 to 6000 mm, and the second temperature section includes a temperature section 2-1 of 1000° C. to 1500° C., a temperature section 2-2 of 1500° C. to 2200° C., and a temperature section 2-3 of 2600° C. to 2800° C. The step of converting the carbonized film to the graphite film by introducing the carbonized film into a second heater having a second temperature section where a temperature linearly increases includes: horizontally moving the carbonized film in the temperature section 2-1 at a rate of 0.33 to 1.33 mm/sec.; and proceeding a heat treatment on the carbonized film for 1 to 4 hours with an increase in an inner temperature of the second heater at a rate of 1 to 5° C./min. in the temperature section 2-1.

Herein, the step of converting the carbonized film to the graphite film by introducing the carbonized film into a second heater having a second temperature section where a temperature linearly increases includes: proceeding a heat treatment on the carbonized film for 1 to 3 hours with an increase in an inner temperature of the second heater at a rate of 5° C./min. or lower in the temperature section 2-2 in order to prevent the carbonized film from generating dust.

Herein, the step of converting the carbonized film to the graphite film by introducing the carbonized film into a second heater having a second temperature section where a temperature linearly increases includes: proceeding a heat treatment on the carbonized film in the temperature section 2-3 in order to enhance flexibility of the graphite film and to make a horizontal heat conductivity equal to or higher than 1000 w/mk.

Herein, the step of converting the carbonized film to the graphite film by introducing the carbonized film into a second heater having a second temperature section where a temperature linearly increases includes: providing a first nitrogen curtain to a portion where the carbonized film is introduced; and providing a second nitrogen curtain to a portion where the graphite film is discharged.

Herein, an inert gas in the second heater has 2 kgf/cm² to 6 kgf/cm².

Herein, the inert gas includes an argon gas.

Herein, the polymer film has a thickness of equal to or more than 25 μm in order for the graphite film not to be broken under handling.

Herein, the polymer film has a density of equal to or more than 1.4 g/cm³ in order not to nave a plurality of wrinkles in the step of converting a polymer film to a carbonized film.

Herein, the polymer film has coefficient of expansion of equal to or less than 25 ppm/° C. and tensile strength of equal to or more than 300 MPa.

Herein, the second heater includes a graphite heater installed therein horizontally, and a thickness of the graphite heater comes to be thinner along a moving direction of the carbonized film in order to increase the inner temperature of the heater.

Herein, the thickness of the graphite heater comes to be thinner in step form along the moving direction of the carbonized film.

Herein, the step of converting a polymer film to a carbonized film by introducing the polymer film into a first heater having a first temperature section includes: introducing the carbonized film into the second heater, the carbonized film being wound on a jig.

Herein, the jig includes: a core installed at a central axis; an outer housing installed outside of the core; and a fixing housing installed between the fixing housing and the outer housing with a predetermined gap therebetween, to fix a polymer film. The polymer film is wound in both a first space and a second space, the first space being formed between the core and the fixing housing, and the second space being formed between the fixing housing and the outer housing.

Herein, the fixing housing includes a plurality of coaxial sub-fixing housings with a predetermined gap therebetween.

Herein, the fixing housing includes a gap to continuously wind the polymer film in both the first space and the second space.

Herein, the jig is made of graphite.

According to the exemplary embodiment of the present invention, a graphite film in roll form can be prepared by continuous processes, and, thus, it is possible to remarkably reduce production cost.

Further, according to the exemplary embodiment of the present invention, it is possible to produce a high-quality graphite film in roll form by remarkably preventing wrinkles which may occur during thermal decomposition of a polymer film.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, a method for preparing a graphite film according to an exemplary embodiment of the present invention will be explained in detail with reference to the accompanying drawings. In the present specification, like or similar components in different exemplary embodiments will be assigned like or similar reference numerals, and corresponding descriptions will be omitted.

Figure 1:
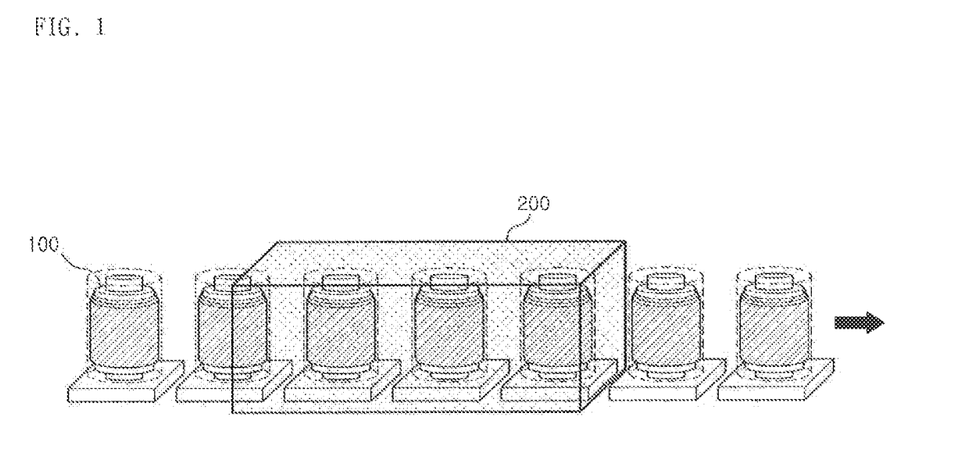
FIG. 1 is a diagram illustrating an example where a carbonized film wound on a jig is introduced into a second heater in a method for preparing a graphite film according to an exemplary embodiment of the present invention.

FIG. 1 is a diagram illustrating an example where a carbonized film wound on a jig 100 is introduced into a second heater 200 in a method for preparing a graphite film according to an exemplary embodiment of the present invention.

As illustrated in FIG. 1, in the method for preparing a graphite film according to the exemplary embodiment of the present invention, carbonized films wound on the jigs 100 in a standing position are continuously introduced into the second heater 200 and converted to graphite films, respectively. The jigs 100 are continuously installed in a standing position on a moving plate with a certain gap therebetween. The moving plate is moved at a predetermined speed, and, thus, the jigs 100 are introduced into the second heater 200.

An inner temperature of the second heater 200 has a temperature gradient in which a temperature linearly increases. More details thereof will be explained with reference to FIG. 4.

With the configuration as described above, wrinkle or bonding does not occur while the polymer film is wound and a high-quality graphite film can be prepared. Therefore, it is possible to remarkably reduce production cost and also possible to simplify a production process.

Hereinafter, the method for preparing a graphite film according to the exemplary embodiment of the present invention will be explained with reference to FIG. 2.

Figure 2:
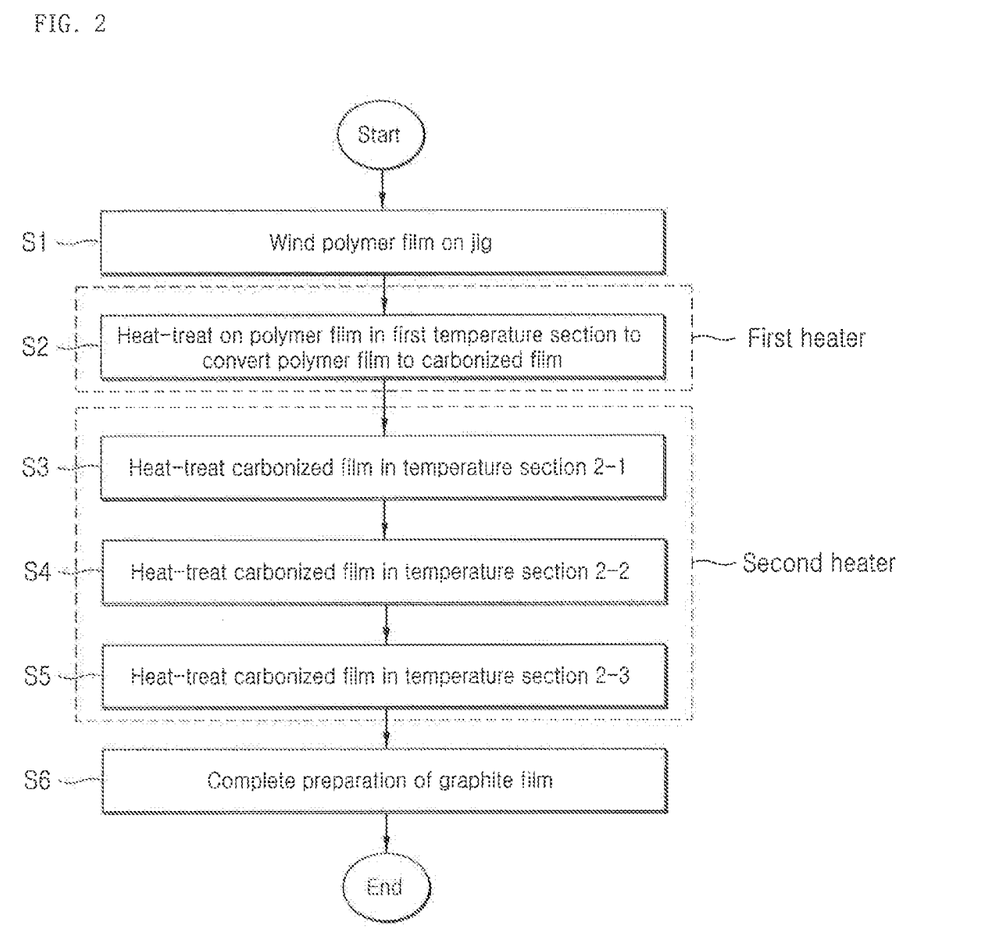
FIG. 2 is a flowchart provided to explain the method for preparing a graphite film according to the exemplary embodiment of the present invention.

FIG. 2 is a flowchart provided to explain the method for preparing a graphite film according to the exemplary embodiment of the present invention. As illustrated in FIG. 2, a polymer film is wound on the jig 100 (S1). The jig 100 will be explained in more detail with reference to FIG. 7 to FIG. 9.

The polymer film needs to have an excellent heat resistance, and when a heat treatment is carried out under a vacuum, nitrogen, or inert gas atmosphere in a temperature range of 600 to 1500° c., the polymer film needs to have a volume decrement of higher than 50% and the inside/outside of the film needs to be carbonized. If a volume decrement is 50% or lower or a depleted polymer film is used, an ultra-high temperature heat treatment of 2000° c. or more cannot be carried out. With this point in view, a polyimide film is used as the polymer film in the present invention.

If the polymer film has a thickness of 50 μm or less, it is advantageous in preparing a thin graphite film. There is prepared a carbonized film having a contraction percentage of 2 to 5% in a plane direction and a contraction percentage of 10 to 20% in a thickness direction in a temperature range of 600 to 1500° c. While a heat treatment at 1500 to 2200° c. or more is carried out, the graphite film is converted. In this case, contraction occurs in the plane direction and contraction and expansion occur in the thickness direction. During the process, if the graphite film as a final product has a thickness of 10 μm or less, the graphite film is broken under handling. Therefore, it is advantageous to use a polymer film having a thickness of 25 μm or more.

Further, preferably, the polymer film has a density of equal to or more than 1.4 g/cm³ in order not to have a plurality of wrinkles in the carbonization step.

Furthermore, the polymer film needs to have a tensile strength of equal to or more than 300 MPa with strong bonds between molecules in order for the strength in the plane direction to be high in a final heat treatment (the second to third temperature sections in the present invention).

Also, the polymer film needs to have coefficient of expansion of equal to or less than 25 ppm/° c. If coefficient of expansion is higher than 25 ppm/° c. problems of wrinkles and distortion caused by a heat treatment occur.

A polymer film having the above requirements is selected and wound on the jig 100. Then, the polymer film is introduced into a first heater having a first temperature section to convert the polymer film into a carbonized film (S2). More details thereof will be explained with reference to FIG. 3.

The carbonized film converted in the first heater as such is introduced into the second heater 200 having a second temperature section where a temperature linearly increases, and then converted to a graphite film (S3 to S5). Herein, the second heater 200 has a length of 4000 to 6000 mm, and the carbonized film is horizontally moved at a rate of 0.33 to 1.333 mm/sec. Herein, if a moving rate is 0.33 or less, it is difficult to control the film in the system, and productivity decreases. If a moving rate is 1.33 or more, the product is vitrified and likely to be broken by impact.

Meanwhile, within the second heater 200, an inert gas (argon gas) is set to have a pressure of 2 kgf/cm$^2$ to 6 kgf/cm$^2$. If an inert gas is set to 2 kgf/cm$^2$ or less, products may have a deviation, and if an inert gas is set to 6 kgf/cm$^2$ or more, production cost increases, resulting in a loss.

A longitudinal length of the second heater 200 is 4000 to 6000 mm since if it is 4000 mm or less, it is difficult to form a temperature gradient and thus wrinkles occur at a product exterior, and if it is 6000 mm or more, productivity decreases and the inert gas is excessively supplied, resulting in a loss in production cost.

Meanwhile, a shape of the second heater 200 will be explained in more detail with reference to FIG. 6.

The second temperature section of the second heater 200 can be divided into a temperature section 2-1 of 1000° c. to 1500° c., a temperature section 2-2 of 1500° c. to 2200° c., and a temperature section 2-3 of 2600° c. to 2800° c. In the temperature section 2-1, the carbonized film is horizontally moved at a rate of 0.33 to 1.33 mm/sec., and a neat treatment is carried out on the carbonized film for 1 to 4 hours with an increase in an inner temperature of the second heater at a rate of 1 to 5° c./min. (S3). Then, a heat treatment is carried out on the carbonized film for 1 to 3 hours with an increase in an inner temperature of the second heater at a rate of 5° c./min. or lower in the temperature section 2-2, in order to prevent the carbonized film from generating dust (S4). Finally, a heat treatment is carried out on the carbonized film in the temperature section 2-3 in order to enhance flexibility of the graphite film and to make a horizontal heat conductivity equal to or higher than 1000 w/mk (S5).

Meanwhile, a first nitrogen curtain and a second nitrogen curtain are provided to an inlet portion of the second heater 200 and an outlet portion of the second heater 200, respectively, in order to prevent occurrence of problems with the heat treatment caused by introduction of impurities during the heat treatment in the second temperature section. Thus, it is possible to prevent external impurities from being introduced into the second heater 200 and thus possible to improve efficiency in preparing a graphite film.

The carbonized film is converted to the graphite film through the above-described processes S3 to S5, and the wound graphite film is present within the jig 100.

Hereinafter, the first temperature section and the second temperature section will be descried in detail with reference to FIG. 3 and FIG. 4.

Figure 3:
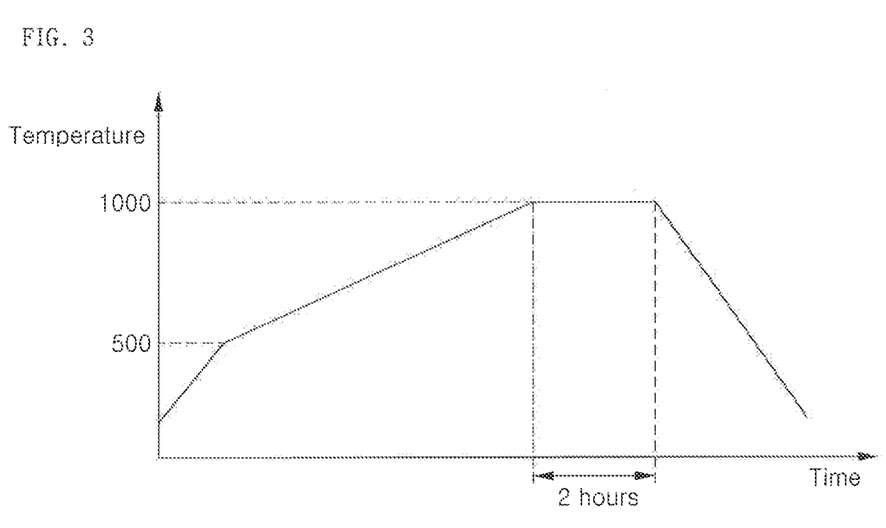
FIG. 3 is a graph illustrating a change in temperature in a first temperature section within a first heater in the method for preparing a graphite film according to the exemplary embodiment of the present invention.

FIG. 3 is a graph illustrating a change in temperature in the first temperature section within the first heater in the method for preparing a graphite film according to the exemplary embodiment of the present invention. As illustrated in FIG. 3, the first temperature section may include a section where the temperature linearly increases from 500±50° c. to 1000° c. The first temperature section is a section for carbonizing a polymer film. The polyimide film used in the present invention as a polymer film is carbonized in the range of 600° c. to 1500° c. The first temperature section includes a section where the temperature increases from 500° c. to 1000° c. as illustrated in FIG. 3, and in this section, the temperature rapidly increases at a rate of 10° c. or more per minute. Then, in a section of about 1000° c., the temperature is maintained for about 2 hours. At this time, the inside/outside of the film is carbonized, and, thus, the polymer film is converted to a carbonized film.

Hereinafter, the second temperature section where the carbonized film prepared in the first heater is converted to a graphite film will be explained with reference to FIG. 4.

Figure 4:
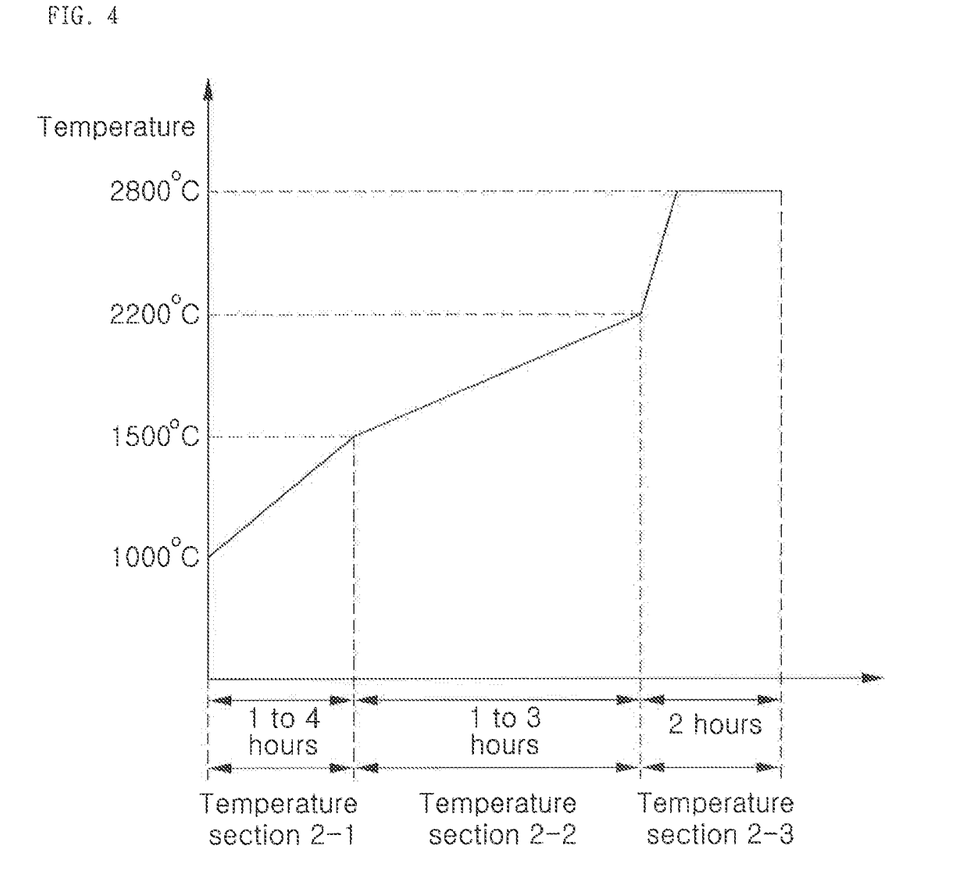
FIG. 4 is a graph illustrating a change in temperature in a second temperature section within the second heater in the method for preparing a graphite film according to the exemplary embodiment of the present invention.

FIG. 4 is a graph illustrating a change in temperature in the second temperature section within the second heater 200 in the method for preparing a graphite film according to the exemplary embodiment of the present invention. As illustrated in FIG. 4, the second temperature section may include a temperature section 2-1 of 1000° c. to 1500° c., a temperature section 2-2 of 1500° c. to 2200° c., and a temperature section 2-3 of 2600° c. to 2800° c.

At 1000° c. to 1500° c. in the temperature section 2-1, the temperature increases by 1° c. to 5° c. per minute for 1 to 4 hours (primary heat treatment). In the primary heat treatment as a process for increasing the temperature, slip of the carbonized film is induced due to carbon on the surface of the carbonized film. Thus, a flexible sheet can be prepared. If a temperature increasing rate is 5° c. or more per minute, an amount of a gas generated by thermal decomposition increases, resulting in wrinkles on a product, surface defects, surface peeling, and cracks.

A temperature increasing rate in the temperature section 2-1 is most preferably 3° c. per minute.

At 1500° c. to 2200° c. in the temperature section 2-2, graphitization is carried out to the inside/outside of the carbonized film. The temperature section 2-2 is maintained for 1 to 3 hours, and the temperature needs to be increased at a rate of 5° c. or less per minute. If a temperature increasing rate is 5° c. or more per minute, contraction and an amount of a gas generated suddenly increase and peeling and pores occur on the surface of the film, resulting in a decrease in density and a decrease in heat conductivity. Further, dust is generated due to graphite delamination.

At 2600° c. to 2800° c. in the temperature section 2-3, flexibility is given to the graphite film. If a final heat treatment is carried out at a high temperature of 2600° c. or more, the graphite film is improved in flexibility, and a high-specification graphite sheet having a horizontal heat conductivity of 1000 w/mk or more and a density of 1.8 g/c.c can be completed.

Since the graphite film can be prepared by the continuous processes as described above, it is possible to simplify a production process and also possible to remarkably reduce production cost.

Hereinafter, a configuration of the second heater 200 will be explained with reference to FIG. 5.

Figure 5:
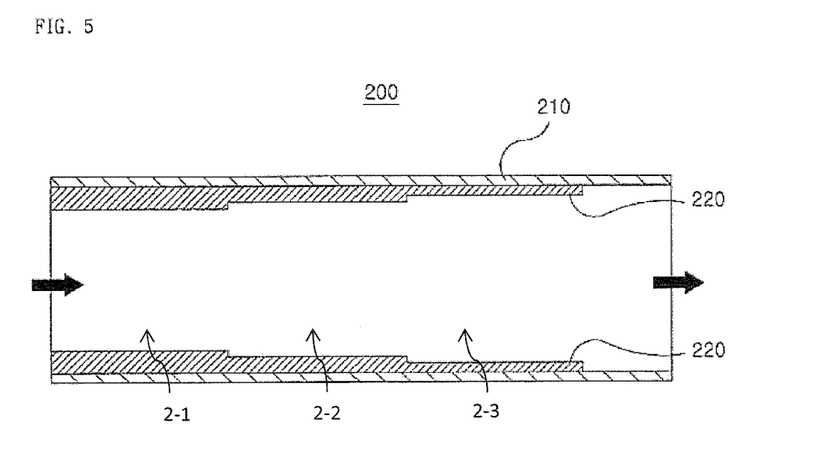
FIG. 5 is a conceptual diagram provided to explain an inner configuration of the second heater used in the method for preparing a graphite film according to the exemplary embodiment of the present invention.

FIG. 5 is a conceptual diagram provided to explain an inner configuration of the second heater 200 used in the method for preparing a graphite film according to the exemplary embodiment of the present invention.

As illustrated in FIG. 5, at an inner surface of a housing 210 of the second heater 200, a graphite heater 220 is horizontally installed. As illustrated above, a thickness of the graphite heater 220 comes to be thinner along a moving direction of the carbonized film. That is, the thickness of the graphite heater 220 comes to be thinner in step form along the moving direction. If a constant current is applied to the graphite heater 220, a thinner portion generates more heat. That is, the thinner portion has a high resistance and thus generates a greater amount of heat. Thus, since the thinner portion radiates more heat and the thicker portion radiates less heat, sections 2-1, 2-2, 2-3, associated with a temperature graph as illustrated in FIG. 4, can be obtained.

In FIG. 5, there has been explained an example of a heater having a desired temperature graph by adjusting thicknesses of the heater. However, the present invention is not limited thereto, and a desired temperature graph can be obtained by varying the number of heaters for each section.

Meanwhile, since the graphite heater 220 is not installed on an outlet side, the second heater may be configured to discharge a final product only at 300° c. or less.

Figure 6:
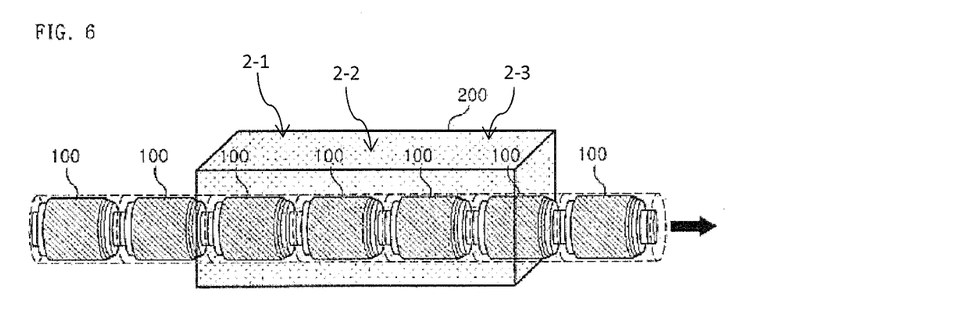
FIG. 6 is a diagram illustrating another example where a carbonized film wound on a jig is introduced into the second heater in the method for preparing a graphite film according to the exemplary embodiment of the present invention.

FIG. 6 is a diagram illustrating another example where the carbonized film wound on the jig 100 is introduced into the second heater 200 in the method for preparing a graphite film according to the exemplary embodiment of the present invention. Unlike the example as illustrated in FIG. 1, the jigs 100 in a lying position are introduced into the second heater 200 in FIG. 6.

Hereinafter, the jig 100 configured to support the polymer film in the method for preparing a graphite film according to the exemplary embodiment of the present invention will be explained in more detail with reference to FIG. 6 to FIG. 9.

Figure 7:
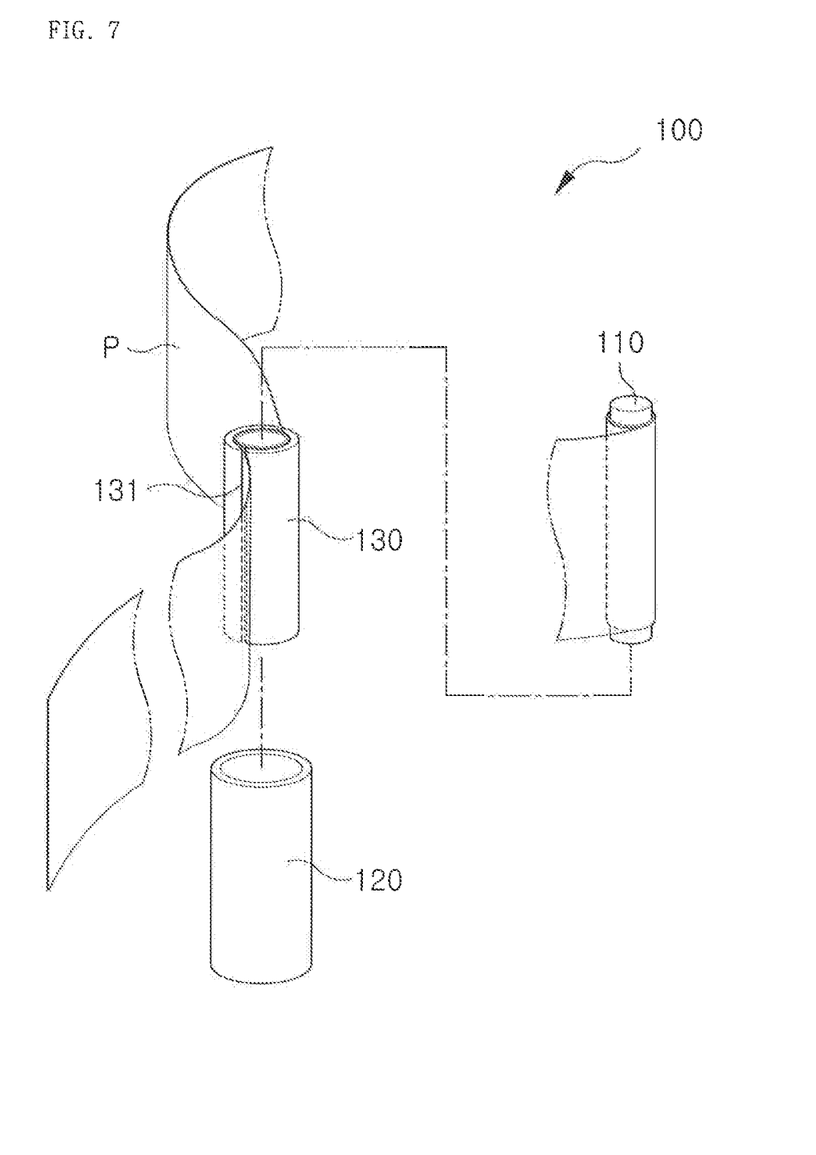
FIG. 7 is an exploded perspective view of the jig used in the method for preparing a graphite film according to the exemplary embodiment of the present invention.
Figure 8:
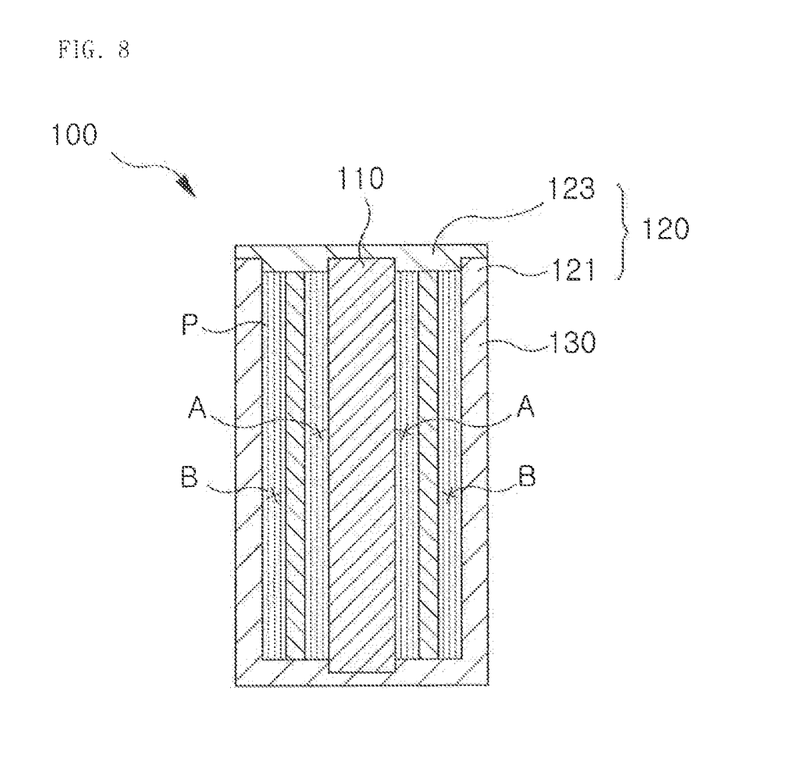
FIG. 8 is a longitudinal cross-sectional view of the jig illustrated in FIG. 7.

FIG. 7 is an exploded perspective view of the jig 100 used in the method for preparing a graphite film according to the exemplary embodiment of the present invention, and FIG. 8 is a longitudinal cross-sectional view of the jig 100 illustrated in FIG. 1. As illustrated in FIG. 7, the jig 100 used in the method for preparing a graphite film according to the exemplary embodiment of the present invention may include a core 110, an outer housing 120, and a fixing housing 130 configured to support a polymer film and installed between the core 110 and the outer housing 120.

The core 110 is installed at a central axis of the jig 100, and has a cylindrical shape as illustrated in the drawings. On one side of the cylindrical core 110, a groove is formed, and a polymer film P is inserted into the groove and wound around the core 110.

Further, at both ends of the core 110, there are protruding portions with which a corresponding groove at a housing 121 of the outer housing 120 and a corresponding groove of a cover 123 are respectively engaged (refer to FIG. 8).

The fixing housing 130 is installed between the core 110 and the outer housing 120 and configured to support the wound polymer film P and transfer a heating temperature of the outside to a first space A (refer to FIG. 8). That is, if the outer housing 120 is heated by the heater, the fixing housing 130 and the core 110 are heated together by heat conduction. Thus, a film in the first space A is heat-treated by the fixing housing 130 and the core 110, and a film in a second space B (refer to FIG. 8) is heat-treated.

Meanwhile, in the fixing housing 130, there is formed a gap 131 that allows the polymer film to be continuously wound in both the second space B and the first space A. That is, the film to be wound on the core 110 is withdrawn to the second space B through the gap 131 and wound on an outer surface of the fixing housing 130.

Further, the gap 131 is configured to exhaust a gas generated during the heat treatment within the first space A.

If the polymer film is wound using the jig 100 configured as describe above, the fixing housing 130 supports the film, and, thus, wrinkles may occur or the exterior may be deformed despite contraction or expansion occurring during the heat treatment of the polymer film.

The jig 100 needs to conduct heat of the first heater and the second heater 200 without being deformed at a high temperature of 2800° c. In this regard, preferably, the jig 100 is made of graphite. Since a final product is a graphite film, graphite is suitable for a material of the jig 100 in order for the graphite film to slip over the jig 100 without adhesion of the film to the jig 100.

Figure 9:
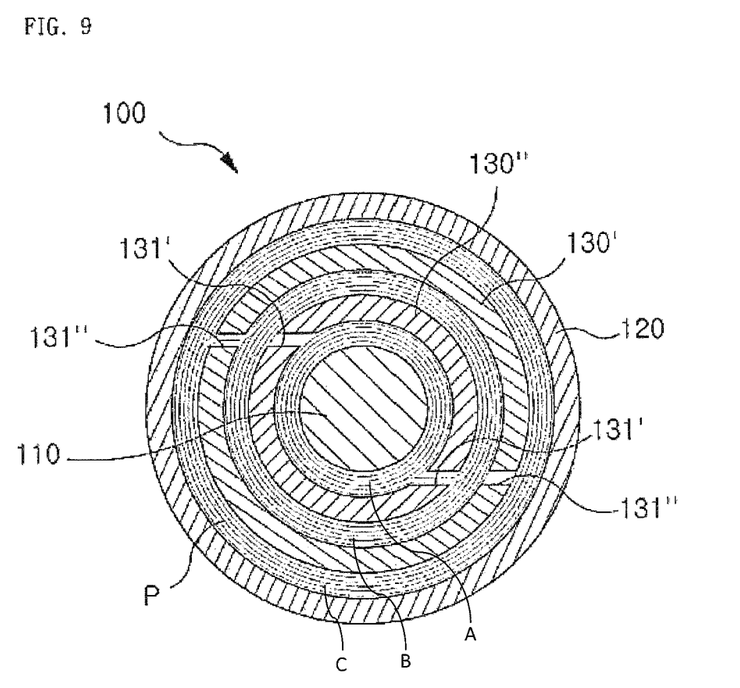
FIG. 9 is a transversal cross-sectional view illustrating another example of the jig used in the method for preparing a graphite film according to the exemplary embodiment of the present invention.

Hereinafter, a case where there are multiple spaces A, B, C, between multiple fixing housings 130, 130', 130" as will be explained in more detail.

FIG. 9 is a transversal cross-sectional view illustrating another example of the jig 100 used in the method for preparing a graphite film according to the exemplary embodiment of the present invention. FIG. 9 illustrates an example where the fixing housing 130 include multiple (for example, two) coaxial sub-fixing housings 130' and 130' with a predetermined gap therebetween. That is, the multiple sub-fixing housings 130' and 130" are arranged outside and around the core 110, and the outer housing 120 is installed outside the sub-fixing housings 130' and 130". In the case of using the multiple sub-fixing housings 130' and 130", there is a further improvement in supporting the polymer film P. Meanwhile, each of the sub-fixing housings 130' and 130" may be formed into two cylindrical partition walls and the gap 131 may be formed between the partition walls. If the sub-fixing housings 130' and 130" are formed into the partition walls as described above, production cost is reduced and it is easy to assembly the jig 100. Further, as illustrated in FIG. 9, there are formed two gaps 131, one of which is formed to withdraw the polymer film P and the other one of which may be used as the gap 131 for exhausting a gas generated during the heat treatment.

According to the exemplary embodiment of the present invention having a configuration as described above, a graphite film in roll form can be prepared by continuous processes, and, thus, it is possible to remarkably reduce production cost.

Further, according to the exemplary embodiment of the present invention, it is possible to produce a high-quality graphite film in roll form by remarkably preventing wrinkles which may occur during thermal decomposition of a polymer film.

The method for preparing a graphite film is not limited to the configuration and the operation method in the above-described exemplary embodiments. Each of the above exemplary embodiments can be selected and combined in whole or in part to make various modifications and changes.

EXPLANATION OF CODES

100: Jig
110: Core
120: Outer housing
121: Housing (of outer housing)
123: Cover
130: Fixing housing
130', 130": Sub-fixing housing
131, 131', 131": Gap
200: Second heater
210: Graphite heater
A: First space
B: Second space

What is claimed is:

1. A method for preparing a graphite film by using a single continuous heater, the method comprising:

converting a polymer film to a carbonized film by winding the polymer film onto a jig and introducing the polymer film wound on the jig into a first heater having a first temperature section; and converting the carbonized film to the graphite film by introducing the carbonized film into a second heater having a second temperature section where a temperature increases linearly;

wherein the jig includes:
a core installed along a central axis;
an outer housing installed outside of the core;
a fixing housing located between the core and the outer housing with a predetermined gap formed therebetween for supporting the polymer film; and
the polymer film is wound in both a first space and a second space, the first space is formed between the core and the fixing housing, and the second space is formed between the fixing housing and the outer housing so that the polymer film accommodated within the first space and the second space can be heated by the outer housing.

2. The method of claim 1, wherein the first temperature section is a section where the temperature linearly increases from 500±50° C. to 1000° C.

3. The method of claim 1, wherein the temperature linearly increases in the second temperature section from 1000° C. to 2800° C.

4. The method of claim 3, wherein the second heater has a length of 4000 to 6000 mm,
the second temperature section includes a first section having a temperature of 1000° C. to 1500° C., a second section having a temperature of 1500° C. to 2200° C., and a third section having a temperature of 2600° C. to 2800° C., and
the step of converting the carbonized film to the graphite film by introducing the carbonized film into the second heater having the second temperature section where a temperature increases linearly includes:
horizontally moving the carbonized film in the first section at a rate of 0.33 to 1.33 mm/sec.; and
proceeding a heat treatment on the carbonized film for 1 to 4 hours with an increase in an inner temperature of the second heater at a rate of 1 to 5° c./min. in the first section.

5. The method of claim 4, wherein the step of converting the carbonized film to the graphite film by introducing the carbonized film into the second heater having the second section where a temperature increases linearly includes proceeding a heat treatment on the carbonized film for 1 to 3 hours with an increase in an inner temperature of the second heater at a rate of 5° c./min. or lower in the second section in order to prevent the carbonized film from generating dust.

6. The method of claim 4, wherein the step of converting the carbonized film to the graphite film by introducing the carbonized film into the second heater having the second section where a temperature increases linearly includes proceeding a heat treatment on the carbonized film in the third section in order to enhance flexibility of the graphite film and to make a horizontal heat conductivity equal to or higher than 1000 w/mk.

7. The method of claim 4, wherein the step of converting the carbonized film to the graphite film by introducing the carbonized film into the second heater having the second section where a temperature increases linearly includes providing a first nitrogen curtain to a portion where the carbonized film is introduced; and providing a second nitrogen curtain to a portion where the graphite film is discharged.

8. The method of claim 1, wherein an inert gas in the second heater has a pressure of 2 kgf/cm² to 6 kgf/cm².

9. The method of claim 8, wherein the inert gas includes an argon gas.

10. The method of claim 1, wherein the carbonized film has a thickness of equal to or more than 25 μm in order for the graphite film not to be broken under handling.

11. The method of claim 1, wherein the carbonized film has a density of equal to or more than 1.4 g/cm³ in order not to have a plurality of wrinkles in the step of converting a polymer film to a carbonized film.

12. The method of claim 1, wherein the carbonized film has coefficient of expansion of equal to or less than 25 ppm/° c. and tensile strength of equal to or more than 300 MPa.

13. The method of claim 1, wherein the fixing housing includes a plurality of coaxial sub-fixing housings with a predetermined gap formed therebetween.

14. The method of claim 1, wherein the fixing housing includes a gap to continuously wind the polymer film in both the first space and the second space.

15. The method of claim 1, wherein the jig is made of graphite.

* * * * *